US012662128B2

(12) United States Patent
Gustafsson et al.

(10) Patent No.: US 12,662,128 B2
(45) Date of Patent: Jun. 23, 2026

(54) METHOD AND SENSOR ARRANGEMENT FOR DETERMINING AN ADVERSE CONDITION OF A POWERTRAIN

(71) Applicant: Scania CV AB, Södertälje (SE)

(72) Inventors: Tobias Gustafsson, Södertälje (SE);
Oscar Hällman, Södertälje (SE);
Anders Larsson, Tullinge (SE); **Per
Wallentin, Järna (SE); Sebastian
Zamani**, Huddinge (SE)

(73) Assignee: Scania CV AB, Södertälje (SE)

( * ) Notice: Subject to any disclaimer, the term of this patent is extended or adjusted under 35 U.S.C. 154(b) by 36 days.

(21) Appl. No.: 18/860,146

(22) PCT Filed: Apr. 25, 2023

(86) PCT No.: PCT/SE2023/050379
§ 371 (c)(1),
(2) Date: Oct. 25, 2024

(87) PCT Pub. No.: WO2023/214914
PCT Pub. Date: Nov. 9, 2023

(65) Prior Publication Data
US 2025/0289437 A1     Sep. 18, 2025

(30) Foreign Application Priority Data
May 3, 2022    (SE) .................................... 2250535-8

(51) Int. Cl.
B60W 30/184          (2012.01)
B60W 40/12           (2012.01)
(Continued)

(52) U.S. Cl.
CPC .......... B60W 30/184 (2013.01); B60W 40/12
(2013.01); G01L 3/104 (2013.01); G07C 5/04
(2013.01)

(58) Field of Classification Search
CPC ..... B60W 30/184; B60W 40/12; G01L 3/104;
G07C 5/04
See application file for complete search history.

(56) References Cited

U.S. PATENT DOCUMENTS 6,154,702 A     11/2000  Fodor et al.
2002/0095985 A1   7/2002  Genise et al.
(Continued)

FOREIGN PATENT DOCUMENTS

DE      102019125366 A1    3/2021
EP         338095 A1      10/1989
(Continued)

OTHER PUBLICATIONS

Liska, "Measurement and Evaluation of Shaft Torsional Vibrations Using Shaft Instantaneous Angular Velocity" (Year: 2019).*
(Continued)

*Primary Examiner* — Aryan E Weisenfeld
(74) *Attorney, Agent, or Firm* — Moore & Van Allen PLLC; W. Kevin Ransom

(57) ABSTRACT

The present disclosure relates to a method for determining an adverse condition of a powertrain of a vehicle. According to a first aspect, this disclosure proposes a method for determining an adverse condition of a powertrain of a vehicle and comprising one or more shafts. The method comprises determining angular displacement between angular positions of one or more shafts of the powertrain at individual points along the powertrain. The method further comprises determining, based on the monitored angular displacement, an adverse condition of one or more parts of the powertrain. The method further comprises performing an action based on the determined adverse condition. The
(Continued)

disclosure also relates to corresponding sensor arrangement and computer program, and to a vehicle comprising the sensor arrangement.

19 Claims, 3 Drawing Sheets

(51) Int. Cl.
  G01L 3/10      (2006.01)
  G07C 5/04      (2006.01)

(56)                  References Cited

U.S. PATENT DOCUMENTS

| | | |
|---|---|---|
| 2002/0116108 A1 | 8/2002 | Grob et al. |
| 2011/0125352 A1 | 5/2011 | Mcgrogan et al. |
| 2012/0143455 A1 | 6/2012 | Lee |
| 2014/0046614 A1 | 2/2014 | Pettersson |
| 2015/0177022 A1 | 6/2015 | Vath et al. |
| 2019/0005749 A1 | 1/2019 | Hong |

FOREIGN PATENT DOCUMENTS

| | | |
|---|---|---|
| GB | 2547058 A | 8/2017 |
| WO | 2017155446 A1 | 9/2017 |
| WO | 2021081051 A1 | 4/2021 |

OTHER PUBLICATIONS

Scania CV AB, International Patent Application No. PCT/SE2023/050379, International Preliminary Report on Patentability, Oct. 29, 2024.

Scania CV AB, International Patent Application No. PCT/SE2023/050379, International Search Report, May 26, 2023.

Scania CV AB, International Patent Application No. PCT/SE2023/050379, Written Opinion, May 26, 2023.

Scania CV AB, Swedish Patent Application No. 2250535-8, Office Action, Nov. 28, 2022.

Scania CV AB, European Patent Application No. 23799760.6, Extended European Search Report, Mar. 3, 2026.

* cited by examiner

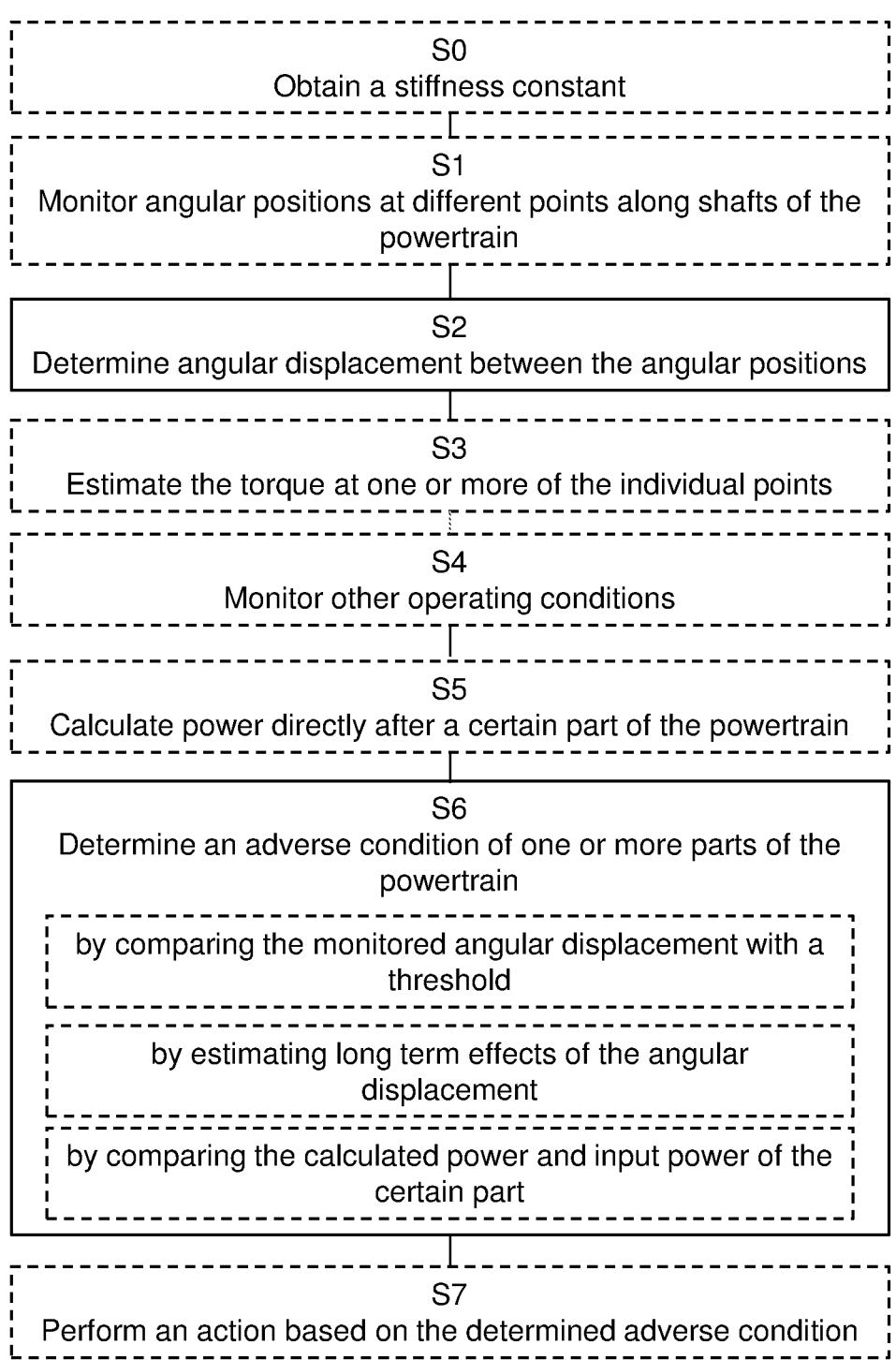

S0
Obtain a stiffness constant

S1
Monitor angular positions at different points along shafts of the powertrain

S2
Determine angular displacement between the angular positions

S3
Estimate the torque at one or more of the individual points

S4
Monitor other operating conditions

S5
Calculate power directly after a certain part of the powertrain

S6
Determine an adverse condition of one or more parts of the powertrain by comparing the monitored angular displacement with a threshold by estimating long term effects of the angular displacement by comparing the calculated power and input power of the certain part

S7
Perform an action based on the determined adverse condition

METHOD AND SENSOR ARRANGEMENT FOR DETERMINING AN ADVERSE CONDITION OF A POWERTRAIN

CROSS-REFERENCE TO RELATED APPLICATIONS

This application is a national stage application (filed under 35 § U.S.C. 371) of PCT/SE2023/050379, filed Apr. 25, 2023 of the same title, which, in turn claims priority to Swedish Patent Application No. 2250535-8 filed on May 3, 2022; the contents of each of which are hereby incorporated by reference.

TECHNICAL FIELD

The present disclosure relates to a method for determining an adverse condition of a powertrain of a vehicle. The disclosure also relates to corresponding sensor arrangement and computer program, and to a vehicle comprising the sensor arrangement.

BACKGROUND

To keep track on vehicle footprints on the global environment, demands on vehicles to report their emission status, such as current power efficiency, is increased. Legislations to consider are for example emission regulations, such as post EU6, China6, CARB, EPA, CO2 etc. A factor that significantly impact emissions of vehicles is efficiency associated with the highest energy consumer in the vehicle namely the powertrain. However, determining actual efficiency of the powertrain in real-time has turned out to be difficult, as the power efficiency is affected by driving conditions, wear, vehicle conditions etc.

Another aspect that may influence the global environment, as well as user satisfaction is service and maintenance. In general, it is preferable, from both perspectives, that repairs are performed at the "right time" in the sense that the risk of total break-down is minimized, while premature repairs are avoided. In the best-case potential damage should be detected and monitored at an early stage and if possible, even prevented. Hence, there is a need for improved vehicle prognostics and error detection to enable optimized maintenance.

SUMMARY

It is an object of the disclosure to alleviate at least some of the drawbacks with the prior art. In particular it is an object to provide a way to determine adverse conditions of a powertrain in a way that enables damage to be prevented and that also enables timely repair, while maintaining and surveilling power efficiency of the vehicle. These objects and others are at least partly achieved by the method and sensor arrangement according to the independent claims, and by the embodiments according to the dependent claims.

According to a first aspect, this disclosure proposes a method for determining an adverse condition of a powertrain of a vehicle, where the powertrain comprises one or more shafts. The method comprises determining angular displacement between angular positions of one or more shafts of the powertrain at individual points along the powertrain.

The method further comprises determining, based on the monitored angular displacement, an adverse condition of one or more parts of the powertrain.

In some embodiments, the adverse condition is associated with a torque of the powertrain indicated by the angular displacement. The method further comprises performing an action based on the determined adverse condition. The proposed method enables early detection of adverse conditions of the powertrain before serious consequences have been caused by the adverse condition.

In some embodiments, the determining comprises determining an adverse condition by comparing the monitored angular displacement with a threshold value. Hence, an adverse condition may sometimes be determined by simply comparing the angular displacement with a threshold limit corresponding to a certain adverse condition.

In some embodiments, the determining comprises estimating long-term effects of the angular displacement, based on predefined criteria for determining harm based on angular displacement. Thereby, it possible to avoid driving conditions that put unnecessary stress on the different powertrain parts and therefore increase the powertrain longevity. This is especially important for vehicles in extreme applications like construction or mining vehicles.

In some embodiments, the predefined criteria determines the harm based on a quantity of the angular displacement and/or a time variations of the angular displacement. In particular, significant displacement in combination with variations may harm mechanical components and should typically be evaluated.

In some embodiments, the determining comprises determining angular displacement between opposite sides, along the powertrain, of a certain part of the drive line and the performing comprises automatically controlling operation of the vehicle such that an angular displacement between the sides of the certain part remains below a maximum displacement, wherein the maximum displacement is defined based on physical strength of the certain part. Thereby, errors in individual parts of the powertrain may be determined and mitigated.

In some embodiments, the method comprises estimating a torque at one or more of the individual points, based on an angular displacement between two of the individual points and a stiffness constant representing characteristics of the powertrain in-between the two individual points, and determine the adverse condition based on the estimated torque. Hence, torque of the powertrain may be estimated based on the angular displacement and the adverse condition may be determined based on the estimated torque.

In some embodiments, the method comprises calculating power directly after a certain part of the powertrain, based on the estimated torque and corresponding rotation speed at an individual point directly after the certain part, and the determining the adverse condition is determined by comparing the calculated power and input power of the certain part. By calculating the amount of energy put into the different powertrain components, and compare it to the output, it is possible to analyze status of the powertrain, whereby condition based maintenance is enabled.

In some embodiments, the method comprises that the one or more parts comprises one or more of a gear box, a differential, an axle, or a shaft forming a part of the powertrain. Hence, the proposed method is applicable to various components of the powertrain.

In some embodiments, the determined adverse condition comprises an error, failure, stress, wear, fading or overload of the one or more parts of the powertrain. Hence, a variety of different errors may be determined before or after they occur.

In some embodiments, the determining an adverse condition is also based on other operating conditions, including engine speed and temperature. The angular displacement may be associated with different adverse effects depending on operating conditions of the vehicle.

In some embodiments, the action comprises providing a warning about the estimated adverse condition. Thereby, a driver or other person may take appropriate actions in time.

In some embodiments, the action comprises an action aiming at preventing, stopping and/or mitigating the adverse condition. Thereby, consequences of the adverse effect may be avoided or reduced.

In some embodiments, the action comprises controlling a drive torque or a break torque and/or controlling a gear box of the vehicle. Thereby, the angular displacement and associated adverse conditions may be controlled.

In some embodiments, the individual points are located at a driven wheel axle, such as centrally on, or at ends of, the driven wheel axle, at wheels of the driven wheel shaft, inside or within a certain distance from a differential gear arranged on the driven wheel axle, inside or within a certain distance from a gear box of the powertrain, and/or inside or within a certain distance from an engine arranged to drive the powertrain. Hence, angular positions may be measured at various points along the powertrain.

In some embodiments, the method comprises monitoring the angular positions using angular position sensors arranged to measure angular positions at the individual points.

According to a second aspect, the disclosure relates to a sensor arrangement for use in a vehicle comprising a powertrain. The arrangement comprises a plurality of angular position sensors arranged to measure angular positions of one or more shafts of the powertrain at individual points along the powertrain and a control arrangement. The control arrangement is configured to determine angular displacement between angular positions of one or more shafts of the powertrain at individual points along the powertrain. The control arrangement is also configured to determine, based on the monitored angular displacement, an adverse condition of one or more parts of the powertrain, and perform an action based on the determined adverse condition. In some embodiments, the adverse condition is associated by a torque of the powertrain indicated by the angular displacement. In further embodiments the control arrangement is configured to perform the method according to any one of the embodiments of the first aspect.

According to a third aspect, the disclosure relates to a vehicle comprising the sensor arrangement of the second aspect.

According to a fourth aspect, the disclosure relates to a computer program comprising instructions which, when the program is executed by a computer, cause the computer to carry out the method according to the first aspect.

According to a fifth aspect, the disclosure relates to a computer-readable medium comprising instructions which, when executed by a computer, cause the computer to carry out the method according to the first aspect.

BRIEF DESCRIPTION OF THE DRAWINGS

FIG. 3 is a flow chart of the proposed method according to the first aspect.

DETAILED DESCRIPTION

The proposed technique is based on the insight that by measuring continuous angular positions at individual points along the powertrain, adverse conditions of one or more parts of the powertrain may be detected and mitigated. In other words, by continually keeping track of angular positions along the powertrain, angular displacement between individual points along the powertrain can be determined. The angular displacement is indicative of torque applied at the individual points causing the angular displacement. Hence, based on the angular displacement, load and stress affecting the powertrain can be analyzed instantaneously and/or over time. Thereby, faulty components may be identified. In addition, it may be possible to predict lifetime of individual components based on load and stress affecting the components.

The power transmission of the powertrain can also be analyzed, as the torque at the individual points may be calculated provided that elasticity properties of the powertrain is known. Thereby, power loss of individual components can be detected and mitigated, whereby power efficiency may be improved.

Figure 1:
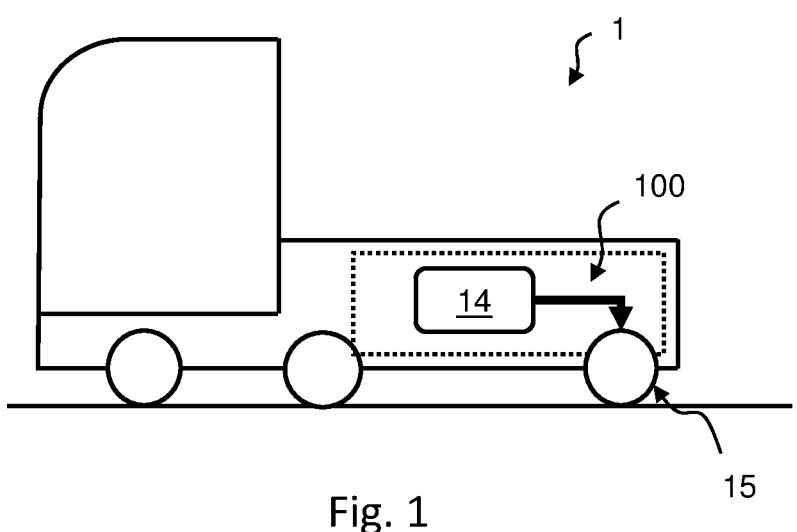
FIG. 1 illustrates a vehicle where the proposed method may be implemented.

The proposed technique will now be described with reference to FIGS. 1-6. FIG. 1 illustrates a vehicle 1, where the proposed technique for determining an adverse condition of a powertrain of a vehicle 1 may be implemented. The vehicle 1 may comprise a means for transportation in broad sense and is for example a bus, a truck, or other similar manned or unmanned vehicle. The vehicle 1 comprises a plurality of electrical systems and subsystems. However, for simplicity only some parts of the vehicle 1 that are associated with the proposed technique are shown in FIG. 1. Hence, the illustrated vehicle 1 comprises an engine 14 and a powertrain 100 configured to transfer power generated by the engine 14 to wheels 15 of the vehicle 1.

Figure 2:
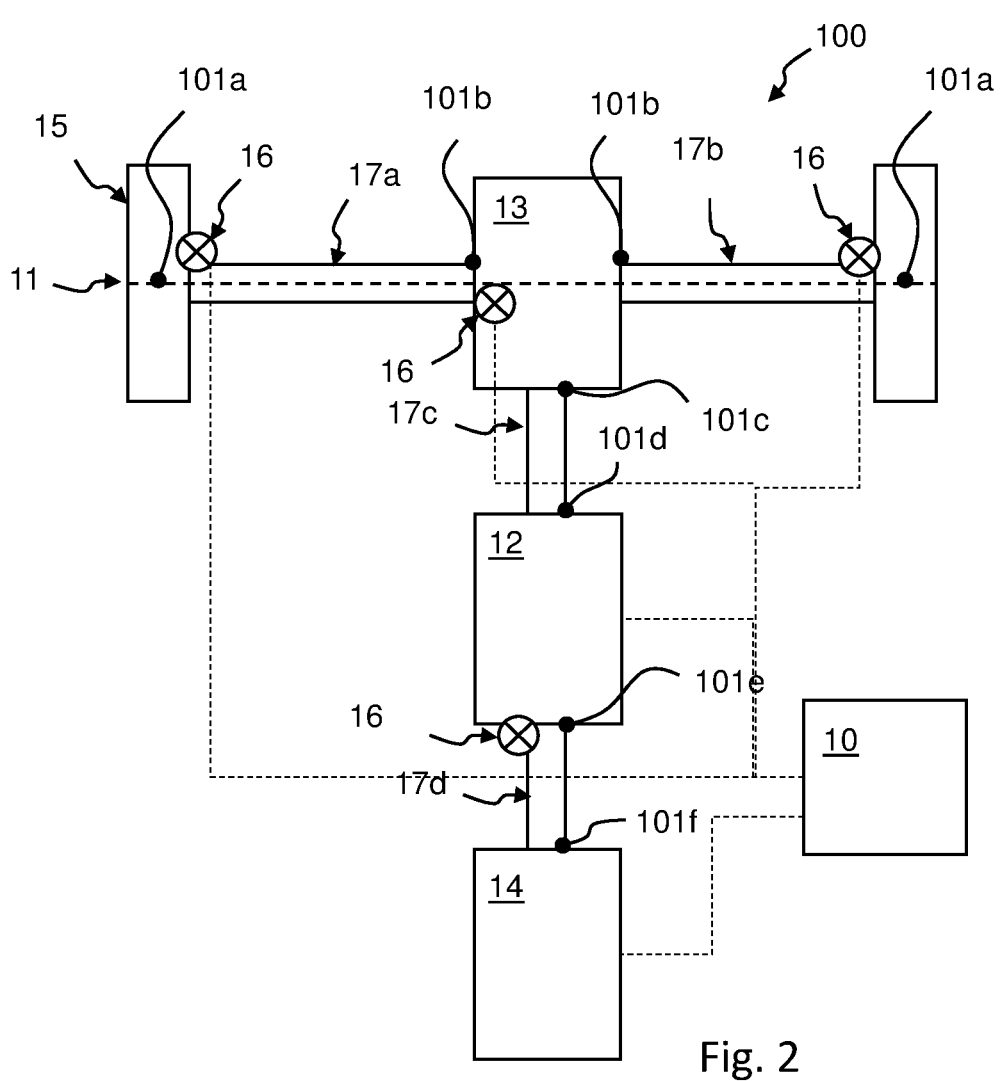
FIG. 2 illustrates a powertrain of a vehicle seen from above.

FIG. 2 illustrates a powertrain 100 where the proposed method is implemented in further detail. The powertrain 100 basically refers to all component that powers the vehicle. The powertrain comprises an engine and a driveline. The driveline is a mechanical system within the vehicle 1 which connects an engine 14 of the vehicle 1 with the driven wheels 15. The illustrated powertrain 100 comprises the engine 14, a gear box 12, a differential gear 13, a plurality of sensors 16, a plurality of shafts 17a-17d and a control arrangement 10.

The plurality of shafts 17a-17d are arranged to transfer power between the other components of the powertrain 100. An axle of the driven wheels 15 of the vehicle 1, here the rear axle, is herein called the driven wheel axle 11. The driven wheel axle 11 comprises one or more shafts 17, here a left shaft 17a and a right shaft 17b.

Hence, in the illustrated example the driven wheel axle 11 is a split axle with the differential gear 13 arranged between the two axles halves. Additional shafts 17c, 17d are arranged between the engine 14 and the gear box 12 and between the gear box 12 and the differential gear 13. The shafts 17 may be split into one or more pieces, made from different materials. There may also be additional shafts 17, such as inside the components.

The differential gear 13 is an arrangement that permits power from the engine 14 to be transmitted to the pair of driving wheels 15. The gear box 12 is arranged to transfer energy from the engine 14 and is used to increase or decrease torque while reducing or increasing rotation speed. The engine 14 is here an electrical machine, but it should be appreciated that the proposed technique may be used for any type of engine.

An angular position sensor 16 is a mechatronic device that measures and converts mechanical rotation into an electrical signal. The angular position sensors 16 are arranged to measure angular positions of one or more shafts of the powertrain 100, at different points along the powertrain 100. Hence, angular position refers to a rotational orientation of a shaft 17 of the powertrain with respect to a specified reference position when the shaft 17 rotate around an axis of rotation. The angular position is expressed as the amount of rotation in radians (degrees, revolutions) about the axis of rotation that is required to change to the reference position. For example, angular position is measured by a tooth wheel sensor, having a certain reference position.

Angular displacement $\propto_A$ refers to a difference between two angular positions along the power train in relation to the reference position. Angular displacement is a vector quantity, which means that angular displacement $\propto_A$ has a size and a direction associated with it. For example, a tooth wheel sensor that scans a tooth wheel, arranged on shafts of the powertrain 100 is used. The tooth wheel sensor may for example comprise two hall effect sensors, a rare earth magnet and appropriate evaluation electronics. The field of the magnet is modulated by the passing target teeth. This modulation is registered by the Hall sensors, converted by a comparator stage to a square wave signal and amplified in a driver stage. The signal also comprises additional position information about where in the cycle the tooth wheel is, e.g., indicated by one or more long pulses caused by one or more long teeth on the tooth wheel positioned at pre-determined positions on the tooth wheel. By measuring the angular positions continuously, it is possible to when needed, while couplings in the powertrain may change, introduce new reference points for parts of, or the entire, powertrain.

The angular position sensors 16 may be arranged at various individual points 101, or positions, along the powertrain 100. In FIG. 2 some example points are denoted 101a-101f. However, the disclosure should not be construed as limited to these examples. For simplicity only a few angular position sensors 16 are illustrated in FIG. 2.

It is typically relevant to measure angular positions close to the wheels 15, as these angular positions represent an output torque of the vehicle 1. In other words, in some embodiments, one or more individual points 101 where angular positions are measured are located at the driven wheel axle 11, such as centrally on, or at ends of, the driven wheel axle 11. For example, the angular position sensor 16 is arranged to measure angular positions at wheels 15 (points 101a) of the driven wheel axle, or inside or within a certain distance (one or a few mm or cm) from a differential gear 13 (points 101b) arranged on the driven wheel axle 11. In some embodiments, one or more angular position sensors are arranged to measure an angular position of a drive gear and/or angular positions of side gears, of the differential gear 13.

Angular positions may in addition be measured between the different components of the powertrain 100. Hence, in some embodiments, individual points 101 where angular positions are measured are located inside or within a certain distance from a gear box 12 (points 101d, 101e) of the powertrain 100. For example, the angular position is measured directly before 101e and directly after 101d the gearbox. The certain distance is typically less than one or a few mm or cm. In some embodiments, individual points 101 where angular positions are measured are located inside or within a certain distance from an engine 14 (point 101f) arranged to drive the powertrain 100. For example, an angular position directly after 101f the engine 14 is measured.

The control arrangement 10 and the angular position sensors 16 form the proposed sensor arrangement 200 for determining an adverse condition of a powertrain of a vehicle 1. The control arrangement 10 is configured to perform the proposed method for determining an adverse condition of a powertrain of a vehicle that will now be described.

FIG. 3 is a flow chart of the proposed method for determining an adverse condition of a powertrain 100 arranged in a vehicle 1 according to the first aspect. The method is performed by a control arrangement 10 (FIG. 2 and FIG. 6) which may be arranged on-board and/or at least partly off-board. The control arrangement 10 is for example an ECU of an inverter controlling torque of the engine 14. The method is typically performed in an ongoing manner while operating the vehicle 1.

The method may be implemented as a computer program comprising instructions which, when the program is executed by a computer (e.g., a processor in the control arrangement 10 (FIG. 6)), cause the computer to carry out the method. According to some embodiments the computer program is stored in a computer-readable medium (e.g., a memory or a compact disc) that comprises instructions which, when executed by a computer, cause the computer to carry out the method.

In an initial step of the proposed method, the control arrangement 10 obtains angular measurements, i.e., sampled sensor values, from angular position sensors 16 arranged at different points 101 along the powertrain 100. The angular measurements are indicative of angular positions sensed by the sensors 16. Hence, in some embodiments, the proposed method comprises measuring S1 the angular positions using angular position sensors 16 arranged at different points along the powertrain 100. The points 101 where angular positions are measured may be distributed along the entire powertrain 100. Alternatively, the angular positions may be measured at points 101 in proximity of parts of certain interest, depending on application.

In some embodiments, the angular position sensors 16 are arranged to measure angular positions of a driven wheel axle 11. For example, angular positions are measured centrally on, or at ends of, the driven wheel axle 11. In some embodiments, angular positions of wheels 15 of the driven wheel shaft are measured. In other examples, angular positions are measured inside or directly adjacent to a differential gear 13 arranged on the driven wheel axle 11. By measuring angular positions at the driven wheel axle 11, wheel torque of wheels 15 of the driven wheel axle may be determined as further described below.

In further examples, angular positions are measured inside or directly adjacent to a certain distance from a gear box 12 of the powertrain 100. For example, an input angle and an output angle of the gear box 12 are measured.

In further examples, angular positions are measured inside or directly adjacent to an engine 14 arranged to drive the powertrain 100. For example, an output angle of the engine 14 is measured.

Figure 4:
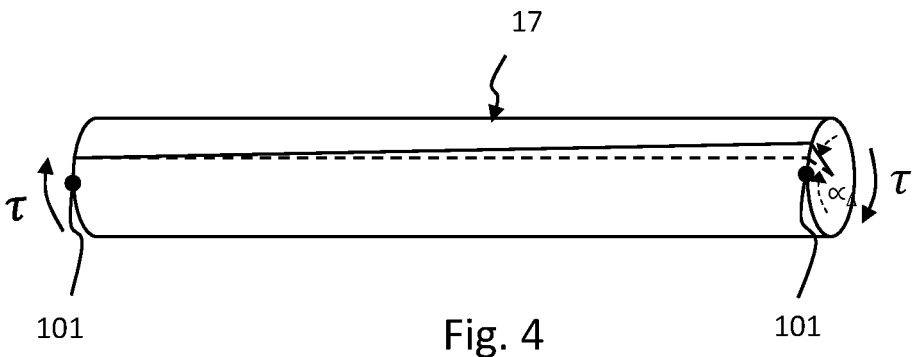
FIG. 4 illustrates power transmission in the powertrain.
Figure 5:
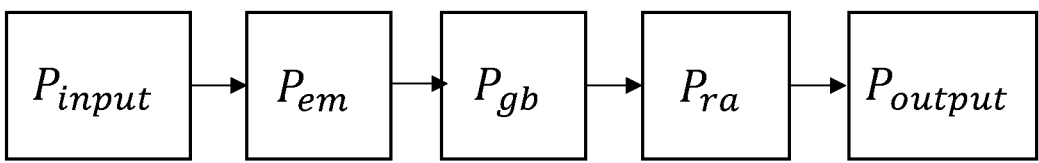
FIG. 5 illustrates windup of a shaft of the powertrain.

As described above the proposed method is based on the concept of monitoring angular displacement between different points, or positions, along the powertrain 100. In other words, the proposed method comprises determining S2 angular displacement between angular positions of one or more shafts 17a-17d of the powertrain 100 at individual points along the powertrain 100. In some embodiments, the determining S2 is based on one or more of angular positions measured in step S1. By analyzing angular displacement $\propto_A$ between different points along the powertrain, it is possible to estimate stress or load of parts of the powertrain. For example, angular displacement $\propto_A$ between two points 101 at ends of a shaft 17 is indicative of windup of the shaft 17, as illustrated in FIG. 4. Such windup may cause stress and wear in the shaft 17, which may cause adverse effects, at least in the long run. In other words, in some embodiments, the method comprises determining S2a angular displacement $\propto_A$ between opposite sides, along the powertrain, of a certain part of the drive line 100, such as of a shaft 17 of the power train 100. A shaft 17 or another mechanical component may tolerate a windup corresponding to a certain angle. Above that angle the shaft of mechanical component may start to wear out prematurely. If the angle exceeds a certain upper limit, it may even break immediately.

The wear and stress are typically associated with a torque that causes the angular displacement $\propto_A$. In a stationary state, when the windup is stationary, torque may be estimated based on two angular positions along the powertrain 100, provided that the elasticity characteristics in-between the points is known. More specifically, windup occurs when ends of a shaft rotate at different speeds. At a perfectly rigid shaft 17 both ends rotate synchronously. However, because the shafts 17 are to some extent elastic, there will in reality be an angular difference between ends of the shafts 17, albeit exceedingly small. Hence, powertrain windup is caused by torsion of the shafts of the powertrain caused by for example engine or brake torque. The angular difference $\propto_A$ between the ends of the shaft 17 is the windup, caused by the torque applied to the respective ends, caused by friction or brake torque on one side and engine torque on the other. When the windup is constant, the torque is the same at both ends.

Estimation of torque based on angular positions of one or more shafts 17 of the powertrain 100 at different points 101 along the powertrain 100 can be calculated as follows. In this example, angular sensors are arranged to measure angular positions at points 101 located at ends 101 of the shaft 17.

Based on the assumption that the mass of the shafts 17 is negligible, it is possible to calculate the torque T applied at the ends of the shafts for a stationary case, where the torque is equal at both ends of the shaft 17. More specifically, Hooke's law (equation (1)) can be applied, which gives that the torque $\tau\tau$ required to wind up a shaft 17 is proportional to the angular displacement $\propto_A$.

$$\tau\tau = kk * \propto_\Delta \qquad (1)$$

The proportionality constant, herein called the stiffness constant kk, is based on characteristics, such as dimensions and material, of the shaft 17 in-between the points 101 where displacement $\propto_A$ is measured. The stiffness constant kk, commonly known as the elasticity constant, represents the elastic behavior of an object, here the body between the points where angular positions are measured. In other words, in some embodiments, the method comprises estimating S3 a torque $\tau\tau$ at two of the individual points, based on an angular displacement $\propto_A$ between two of the individual points and a stiffness constant kk representing characteristics of the powertrain 100 in-between the two individual points. In an example embodiment, wheel torque is estimated based on an angular displacement $\propto_A$ between a point 101a at the wheel 15 and a position 101b at the differential gear 13, such as on a corresponding side gear of the differential gear 13. By knowing the stiffness constant in-between, the two points 101a, 101b, wheel torque may be estimated using the formula above. Corresponding calculations may be made for any shaft 17 of the powertrain 100 provided that the corresponding stiffness constant is known.

Figure 6:
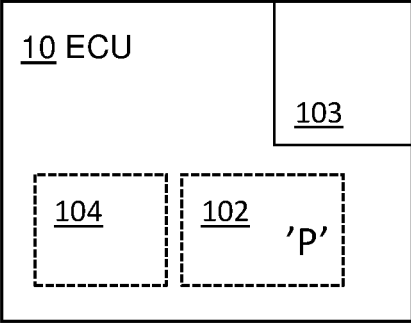
FIG. 6 illustrates a control arrangement configured to perform the method.

Hence, torque is estimated based on a stiffness constant representing characteristics of the one or more shafts 17 of the drivetrain 100. The stiffness constant may be obtained S0 in various ways. The stiffness constant may then be preconfigured in the vehicle, such as in the memory 102 of the control arrangement 100 (FIG. 6). This may be done during manufacturing or at a later point in time. Hence, step S0 is an initial step that may be performed a long time before the rest of the method. There may be one stiffness constant representing characteristics of an entire shaft or a plurality of stiffness constants representing individual parts of the shaft.

One way to obtain the stiffness constant of a shaft 17 is to calculate it based on dimensions and material of the shaft 17. In some embodiments, the method comprises obtaining S0 the stiffness constant based on dimensions and material of the one or more parts of the powertrain 100 in-between the two individual points.

Another possibility is to simply make a stress test, where the shafts 17 are winded up in a controlled environment. The stiffness constant may then be calculated based on an angular displacement $\propto_A$ caused by a known torque. If the same shaft design is used in many vehicles, this test may be performed one time and the same value can be used in several vehicles with identical powertrain 100. In other words, in some embodiments, the method comprises obtaining S0 the stiffness constant by applying a predefined torque on the one or more individual points 101, in a test environment and measuring a resulting angular displacement $\propto_A$ of the ends of the one or more shafts.

The stress or wear caused by angular displacement, may depend on other operating conditions, such as engine speed, temperature, gear and so on. Hence, in some embodiments, the method comprises monitoring S4 other operating conditions in parallel with the angular displacement.

The determined angular displacement $\propto_A$ between points 101 along the powertrain 100 may also be used to analyze power efficiency of the powertrain 100. Power damping of one component may basically be determined by comparing power input and power output on the component. For example, wheel torque $\tau\tau_{wwheeeeee}$ in combination with the wheel speed $\omega\omega_{wwheeeeee}$ gives the power $PP_{000000000000}$, at the wheels 15, which is basically the output of the vehicle 1, see equation (2).

$$PP_{000000000000} = \tau\tau_{wwheeeeee} * \omega\omega_{wwheeeeee} \qquad (2)$$

The difference between this power $PP_{000000000000}$ and the input power $PP_{iiii00000000}$ (i.e., electrical power of an electrical engine or fuel consumption for combustion engines) gives a real time efficiency for the complete powertrain 100. This efficiency can be utilized to ensure that the certified powertrain performance is fulfilled and might be a subject for future $CCCC_2$ emissions requirements.

In addition, a lowered power efficiency is an indication that something is faulty in the powertrain 100. By making intermediate power calculations in-between mechanical components of the powertrain 100 higher granularity of the faulty component (engine 14, gear box 12 or driven wheel axle 11) can be achieved. For example, immediate power calculations may be performed after the engine $PP_{eeee}$, after the gearbox $PP_{gggg}$ and at the rear axle $PP_{rrrr}$ (after the differential gear 13), see FIG. 5. In other words, in some embodiments, the method comprises calculating S5, power directly after a certain part of the powertrain 100, based on the estimated torque and corresponding rotation speed at an individual point directly after the certain part.

Effects on the powertrain 100 caused by the angular displacement can then be estimated, either directly based on a deviation angle or via succeeding calculations. In other words, the method comprises determining S6, based on the monitored angular displacement, an adverse condition of one or more parts of the powertrain 100. In some embodiments, the adverse condition is associated with a torque of the powertrain indicated by the angular displacement. The adverse condition may affect one of more parts of the powertrain, such as the gear box 12, the differential 13, a driven axle 11 or a shaft 17a-17d forming a part of the powertrain 100.

The adverse condition may be an immediate condition, such as a hardware failure or breakdown in a component of the powertrain. The adverse condition may also be a condition with long-term effects such as stress, wear, fading, binding, or overload of the one or more parts of the powertrain 100.

Whether a certain angular displacement may cause an adverse condition may depend on other parameters associated with operation of the vehicle 1. Hence, in some embodiments, the method comprises the determining S6 an adverse condition is also based on other operating conditions, including engine speed, turning angle, slope, and temperature.

In one example embodiment, a hardware component may correspond to a certain maximum angular displacement that should not be exceeded due to risk of hardware failure or efficiency decrease. For example, a closed differential gear 13 may be harmed if angular displacement between its left and right sides exceed a certain threshold. The certain threshold is different for different hardware. In other words, in some embodiments, the determining S6 comprises determining the adverse condition by comparing the monitored angular displacement with a threshold value, such as a when the monitored angular displacement exceeds a maximum angular displacement.

Parts of the powertrain 100 may also be associated with maximum torque that should not be exceeded due to e.g., hardware failure or efficiency decrease. In some embodiments the determining S6 comprises determining the adverse condition based on the estimated torque $\tau\tau$ at one or more of the points where angular position is measured.

The adverse condition may also be determined by analyzing power changes along the drive line. If power damping of a component suddenly increases this may be an indication that something is wrong with the component. In other words, in some embodiments the determining S6 comprises determining S6 the adverse condition by comparing the calculated power and input power of a certain part of the powertrain 100. The certain part may include one or more mechanical components. By analyzing how damping varies over time errors may be detected early before major damage is caused. This may also increase security, in particular if power damping is significant, as the power is typically transformed to heat somewhere inside the component, which may cause severe errors if not detected in time.

Problems caused by the angular displacement, or by torque causing the angular displacement may not always appear instantly. For example, tension may cause long-term effects, in particular varying torque of certain amplitude may be problematic. In other words, in some embodiments, the determining S6 comprises estimating long-term effects of the angular displacement, based on predefined criteria for determining harm based on angular displacement. The criteria may define limits in terms of amplitude and/or variations in angular displacement or torque. The criteria may also define combinations of one or more of certain amplitudes and variations that may potentially harm parts of the powertrain 100. Hence, in some embodiments, the predefined criteria determine the harm based on a quantity of the angular displacement and/or time variations of the angular displacement.

Based on the determined adverse effects damage may be mitigated. Hence, the method comprises performing S7 an action based on the determined adverse condition. For example, a warning about the adverse condition may be sent to a driver, service station, fleet manager etc. In other words, in some embodiments, the method comprises providing a warning about the estimated adverse condition. The warning may be an electronic message provided by wireless communication or a message provided via a user interface using visible, audible, or tactile means. For example, a message may be presented on a dashboard of the vehicle indicating that service is required within a certain number of kilometers. The message may include more information about exactly what part needs to be exchanged or about how the adverse condition may be mitigated, such as "reduce speed!".

Sometimes it is possible to perform a specific action to avoid or mitigate the adverse condition. For example, wear in the gear box 12 may be avoided by decreasing torque or changing gear. Such an action may be initiated automatically, in particular in an autonomous vehicle. In other words, in some embodiments, the action comprises an action aiming at preventing, stopping and/or mitigating the adverse condition. For example, an action mitigating the adverse condition may comprise controlling a drive torque, controlling a break torque, and controlling a gear box of the vehicle 1. Alternatively, a driver may be informed about an appropriate action to take.

In another example, the action comprises to assure that an angular displacement never exceeds a maximum displacement based on for example physical strength of the certain part of the powertrain 100. This may for example be done by decreasing engine torque when the angular displacement approaches the maximum displacement. In this way hardware may be protected. In other words, in some embodiments the performing S7 comprises automatically controlling S7a operation of the vehicle such that an angular displacement $\propto_A$ between the sides of the certain part remains below a maximum displacement, wherein the maximum displacement is defined based on physical strength of the certain part. In one example embodiment, the controlling S7a comprises controlling engine and or brake torque such that a maximum angular displacement between wheel angles of left and right wheels 15 never exceed a maximum displacement when the differential gear 13 is locked. In this way hardware failure in the differential gear 13 or the driven wheel axle 11 due to too high torque may be avoided.

FIG. 6 illustrates a control arrangement 10 configured to implement the proposed method for determining an adverse condition of a powertrain 100 of a vehicle 1, in more detail. In some embodiments, the control arrangement 10 is a "unit" in a functional sense. Hence, in some embodiments the control arrangement 10 is a control arrangement comprising several physical control devices that operate in cooperation. The control arrangement may be arranged on-board and/or at least partly off-board.

The control arrangement comprises a processor 104 and memory 102. The control arrangement 10, or more specifically the processor 104 of the control arrangement 10, is configured to cause the control arrangement 10 to perform all aspects of the method described above and below. This is typically done by running computer program code P stored in the data storage or memory 102 in the processor 104 of the control arrangement 10. The memory 102 may also be configured to store various relevant parameters, such as predefined criteria for determining harm based on angular displacement and stiffness constant(s) of the powertrain 100.

The control arrangement 10 may also comprise a communication interface 103 for communicating with other control units of the vehicle (for example over the ECU) and/or with external systems, such as with an off-board server.

More specifically, the control arrangement 10 is configured to determine angular displacement between angular positions of one or more shafts 17a-17d of the powertrain 100 at individual points along the powertrain 100. The control arrangement 10 is further configured to determine, based on the monitored angular displacement, an adverse condition of one or more parts of the powertrain 100, wherein the adverse condition is associated with a torque of the powertrain indicated by the angular displacement, and to perform an action based on the determined adverse condition.

The terminology used in the description of the embodiments as illustrated in the accompanying drawings is not intended to be limiting of the described method, control arrangement or computer program. Various changes, substitutions and/or alterations may be made, without departing from disclosure embodiments as defined by the appended claims.

The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g., a processor may fulfil the functions of several items recited in the claims.

The invention claimed is:

1. A method for determining an adverse condition of a powertrain arranged in a vehicle, where the powertrain comprises one or more shafts, the method comprising:
   determining angular displacement between angular positions of one or more shafts of the powertrain at individual points along the powertrain;
   determining, based on the angular displacement, an adverse condition of one or more parts of the powertrain, wherein the adverse condition is associated with a torque of the powertrain indicated by the angular displacement; and
   performing an action based on the determined adverse condition.

2. The method of claim 1, wherein determining an adverse condition comprises determining an adverse condition by comparing the angular displacement with a threshold value.

3. The method according to claim 1, wherein determining an adverse condition comprises estimating long-term effects of the angular displacement, based on predefined criteria for determining harm based on angular displacement.

4. The method of claim 3, wherein the predefined criteria determines the harm based on a quantity of the angular displacement and/or a time variations of the angular displacement.

5. The method according to claim 1, wherein determining the angular displacement comprises determining angular displacement between opposite sides, along the powertrain, of a certain part of a drive line of the vehicle, and
   wherein performing an action comprises automatically controlling operation of the vehicle such that an angular displacement between the opposite sides of the certain part of the drive train remains below a maximum displacement, wherein the maximum displacement is defined based on physical strength of the certain part.

6. The method according to claim 1, comprising:
   estimating a torque at one or more of the individual points, based on an angular displacement between two of the individual points and a stiffness constant representing characteristics of the powertrain in-between the two individual points, and determine the adverse condition based on the estimated torque.

7. The method according to claim 6, comprising:
   calculating power directly after a certain part of the powertrain, based on the estimated torque and corresponding rotation speed at an individual point directly after the certain part of the drive train, and
   wherein determining the adverse condition comprises comparing the calculated power and input power of the certain part of the drive train.

8. The method according to claim 1, wherein the one or more parts comprises one or more of a gear box, a differential, an axle, or a shaft forming a part of the powertrain.

9. The method according to claim 1, wherein the determined adverse condition comprises an error, failure, stress, wear, fading, or overload of the one or more parts of the powertrain.

10. The method according to claim 1, wherein the action comprises:
   an action aiming at preventing, stopping, and/or mitigating the adverse condition; or
   providing a warning about the estimated adverse condition.

11. A computer program product stored on a non-transitory computer-readable medium, said computer program product for determining an adverse condition of a powertrain arranged in a vehicle, where the powertrain comprises one or more shafts, wherein said computer program product comprising computer instructions to cause one or more computing devices to perform the following operations:
   determining angular displacement between angular positions of one or more shafts of the powertrain at individual points along the powertrain;
   determining, based on the angular displacement, an adverse condition of one or more parts of the powertrain, wherein the adverse condition is associated with a torque of the powertrain indicated by the angular displacement; and performing an action based on the determined adverse condition.

12. A sensor arrangement for use in a vehicle comprising a powertrain, the arrangement comprising:

a plurality of angular position sensors arranged to measure angular positions of one or more shafts of the powertrain at individual points along the powertrain; and a control arrangement configured to:

determine angular displacement between angular positions of one or more shafts of the powertrain at individual points along the powertrain;

determine, based on the angular displacement, an adverse condition of one or more parts of the powertrain, wherein the adverse condition is associated with a torque of the powertrain indicated by the angular displacement; and perform an action based on the determined adverse condition.

13. A vehicle comprising a powertrain and a sensor arrangement, the arrangement comprising:

a plurality of angular position sensors arranged to measure angular positions of one or more shafts of the powertrain at individual points along the powertrain; and a control arrangement configured to:

determine angular displacement between angular positions of one or more shafts of the powertrain at individual points along the powertrain;

determine, based on the angular displacement, an adverse condition of one or more parts of the powertrain, wherein the adverse condition is associated with a torque of the powertrain indicated by the angular displacement; and perform an action based on the determined adverse condition.

14. The computer program product of claim 11, wherein determining an adverse condition comprises determining an adverse condition by comparing the angular displacement with a threshold value.

15. The computer program product of claim 11, wherein determining an adverse condition comprises estimating long-term effects of the angular displacement, based on predefined criteria for determining harm based on angular displacement.

16. The computer program product of claim 15, wherein the predefined criteria determines the harm based on a quantity of the angular displacement and/or a time variations of the angular displacement.

17. The sensor arrangement of claim 12, wherein determining an adverse condition comprises determining an adverse condition by comparing the angular displacement with a threshold value.

18. The sensor arrangement of claim 12, wherein determining an adverse condition comprises estimating long-term effects of the angular displacement, based on predefined criteria for determining harm based on angular displacement.

19. The sensor arrangement of claim 18, wherein the predefined criteria determines the harm based on a quantity of the angular displacement and/or a time variations of the angular displacement.

* * * * *